United States Patent
Kim et al.

(10) Patent No.: US 12,405,050 B2
(45) Date of Patent: Sep. 2, 2025

(54) STEEL SHEET, REFRIGERATOR INCLUDING THE SAME, AND MANUFACTURING METHOD OF STEEL SHEET

(71) Applicant: SAMSUNG ELECTRONICS CO., LTD., Suwon-si (KR)

(72) Inventors: Choongkeon Kim, Suwon-si (KR); Youngdeog Koh, Suwon-si (KR); Kwangjoo Kim, Suwon-si (KR); Daeyoung Kim, Suwon-si (KR); Youngtae Kim, Suwon-si (KR); Joohyun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 18/217,792

(22) Filed: Jul. 3, 2023

(65) Prior Publication Data

US 2023/0341172 A1   Oct. 26, 2023

Related U.S. Application Data

(63) Continuation of application No. PCT/KR2022/004120, filed on Mar. 24, 2022.

(30) Foreign Application Priority Data

Apr. 15, 2021   (KR) .................. 10-2021-0049479

(51) Int. Cl.
   *F25D 23/02*   (2006.01)
   *B05D 5/02*   (2006.01)
   (Continued)

(52) U.S. Cl.
   CPC .......... *F25D 23/028* (2013.01); *B05D 5/02* (2013.01); *B05D 7/53* (2013.01); *C08K 3/36* (2013.01);
   (Continued)

(58) Field of Classification Search
   None
   See application file for complete search history.

(56) References Cited

U.S. PATENT DOCUMENTS

| 8,500,225 B2 | 8/2013 | Kim et al. |
| 8,956,734 B2 | 2/2015 | Song et al. |
| (Continued) | | |

FOREIGN PATENT DOCUMENTS

| EP | 0522454 A1 * | 1/1993 | |
| EP | 3327097 A1 * | 5/2018 | ............ C08J 7/0427 |
| (Continued) | | | |

OTHER PUBLICATIONS

International Search Report (PCT/ISA/210) issued by the International Searching Authority on Mar. 25, 2022 in corresponding International Application No. PCT/KR2022/004120.

(Continued)

*Primary Examiner* — Hanh V Tran
(74) *Attorney, Agent, or Firm* — Sughrue Mion, PLLC

(57) ABSTRACT

Provided is a steel sheet having lowered visibility of the curvature of the outer surface by lowering the side glossiness of the steel sheet used on a refrigerator body, a refrigerator comprising same, and a manufacturing method of the steel sheet. The refrigerator includes: the body; and a door rotatably coupled to the body. The body includes: a base steel sheet, a base coating layer provided on the base steel sheet and comprising 2.5 to 4.0 weight % of silica relative to the total weight of the base coating layer, and a clear coating layer provided on the base coating layer and comprising silica and 2.0 to 5.0 weight % of beads relative to the total weight of the clear coating layer.

16 Claims, 5 Drawing Sheets

(51) Int. Cl.
    *B05D 7/00*           (2006.01)
    *C08K 3/36*           (2006.01)
    *C08K 9/08*           (2006.01)
    *C09D 5/03*           (2006.01)

(52) U.S. Cl.
    CPC ............... *C08K 9/08* (2013.01); *C09D 5/032* (2013.01); *B05D 2202/10* (2013.01); *B05D 2601/22* (2013.01); *C08K 2201/003* (2013.01); *F25D 2400/18* (2013.01)

(56) References Cited

U.S. PATENT DOCUMENTS

| | | | |
|---|---|---|---|
| 9,043,900 | B1 | 5/2015 | Kim et al. |
| 10,739,057 | B2 * | 8/2020 | Segawa ................. F25D 17/045 |
| 10,760,849 | B2 * | 9/2020 | Jung ..................... F25D 23/064 |
| 10,808,989 | B2 * | 10/2020 | Yoon ....................... F25D 11/00 |
| 2005/0240878 | A1 | 10/2005 | Anthony et al. |
| 2010/0190531 | A1 | 7/2010 | Hasegawa |
| 2012/0054838 | A1 | 3/2012 | Kim et al. |
| 2012/0074227 | A1 | 3/2012 | Ferren et al. |
| 2014/0040373 | A1 | 2/2014 | Takamatsu |
| 2014/0344954 | A1 | 11/2014 | Kim et al. |
| 2015/0106765 | A1 | 4/2015 | Lee et al. |
| 2015/0199523 | A1 | 7/2015 | Hamilton et al. |
| 2015/0356304 | A1 | 12/2015 | You |
| 2017/0316250 | A1 | 11/2017 | Roh et al. |
| 2018/0014198 | A1 | 1/2018 | Suh et al. |
| 2018/0307855 | A1 | 10/2018 | Dogu et al. |
| 2020/0032399 | A1 * | 1/2020 | Shibao ................... B32B 15/09 |
| 2020/0255687 | A1 | 8/2020 | Kim et al. |
| 2021/0388460 | A1 * | 12/2021 | Teipel .................... C21D 6/002 |

FOREIGN PATENT DOCUMENTS

| | | | |
|---|---|---|---|
| EP | 3447415 | A1 | 2/2019 |
| JP | 11-156291 | A | 6/1999 |
| JP | 2005-165777 | A | 6/2005 |
| JP | 2006-289930 | A | 10/2006 |
| JP | 2007-004383 | A | 1/2007 |
| JP | 2010-177972 | A | 8/2010 |
| JP | 4700921 | B2 | 6/2011 |
| JP | 2011136566 | A * | 7/2011 |
| JP | 2014-29587 | A | 2/2014 |
| KR | 10-2008-0024531 | A | 3/2008 |
| KR | 10-2011-0059080 | A | 6/2011 |
| KR | 10-1056943 | B1 | 8/2011 |
| KR | 10-2012-0014013 | A | 2/2012 |
| KR | 10-2012-0066085 | A | 6/2012 |
| KR | 10-2012-0089936 | A | 8/2012 |
| KR | 20130004167 | U * | 7/2013 |
| KR | 10-1310758 | B1 | 9/2013 |
| KR | 10-1314135 | B1 | 10/2013 |
| KR | 10-2014-0046102 | A | 4/2014 |
| KR | 10-2014-0098544 | A | 8/2014 |
| KR | 10-2015-0045264 | A | 4/2015 |
| KR | 10-1510555 | B1 | 4/2015 |
| KR | 10-2015-0092480 | A | 8/2015 |
| KR | 10-1586979 | B1 | 1/2016 |
| KR | 10-2016-0089711 | A | 7/2016 |
| KR | 10-2016-0110384 | A | 9/2016 |
| KR | 10-2016-0114316 | A | 10/2016 |
| KR | 10-2017-0122386 | A | 11/2017 |
| KR | 10-2019-0023158 | A | 3/2019 |
| KR | 10-2019-0061465 | A | 6/2019 |
| KR | 10-1998956 | B1 | 9/2019 |
| KR | 10-2022-0039412 | A | 3/2022 |
| WO | 2011/048930 | A1 | 4/2011 |

OTHER PUBLICATIONS

Written Opinion (PCT/ISA/237) issued by the International Searching Authority on Mar. 25, 2022 in corresponding International Application No. PCT/KR2022/004120.

International Search Report (PCT/ISA/210) issued by the International Searching Authority on Jul. 21, 2022 in corresponding International Application No. PCT/KR2022/004120.

* cited by examiner

STEEL SHEET, REFRIGERATOR INCLUDING THE SAME, AND MANUFACTURING METHOD OF STEEL SHEET

CROSS-REFERENCE TO RELATED APPLICATIONS

This application is by-pass continuation application of International Application No. PCT/KR2022/004120, filed on Mar. 24, 2022, which based on and claims priority to Korean Patent Application No. 10-2021-0049479, filed on Apr. 15, 2021, in the Korean Intellectual Property Office, the disclosures of which are incorporated by reference herein in their entireties.

BACKGROUND

1. Field

The disclosure relates to a refrigerator, and more specifically, to a steel sheet for a refrigerator body and a refrigerator including the same.

2. Description of Related Art

Refrigerators are home appliances that keep food cool by including a body having a storage compartment and a cold air supply device provided to supply cold air to the storage compartment.

The storage compartment includes a refrigerator compartment that refrigerates food while being maintained at about 0 to 5° C. and a freezer compartment that keeps food frozen while being maintained at about 0 to −30° C. The storage compartment is provided so that a front surface is open for food input and output, and the front surface of the storage compartment is opened and closed by a door.

SUMMARY

Provided are a steel sheet, in which the visibility of the curvature of the outer surface of a steel sheet used in a refrigerator body is decreased by lowering the side glossiness of the steel sheet, a refrigerator including the same, and a method of manufacturing the steel sheet.

According to an aspect of the disclosure, a refrigerator includes: a body; and a door rotatably coupled to the body, and the body includes: a base steel sheet; a base coating layer provided on the base steel sheet and comprising 2.5 to 4.0 wt % of a silica based on a total weight of the base coating layer; and a clear coating layer provided on the base coating layer and comprising a silica and 2.0 to 5.0 wt % of beads based on a total weight of the clear coating layer.

The base coating layer may include 3.5 wt % of the silica based on the total weight of the base coating layer.

The silica of the base coating layer may include acrylic-coated organic silica.

The clear coating layer may include 2.0 wt % of beads based on the total weight of the clear coating layer.

The beads of the clear coating layer may include a size of 20 to 50 μm in diameter.

The beads of the clear coating layer may include a size of 20 μm in diameter.

The clear coating layer may include 5.0 wt % of the second silica based on the total weight of the clear coating layer.

The body may include an 85° gloss measurement value of 10 or less.

The 85° gloss measurement value may be less than a 60° gloss measurement value of the body.

According to an aspect of the disclosure, a steel sheet include a base steel sheet; a base coating layer provided on the base steel sheet and comprising 2.5 to 4.0 wt % of a silica based on a total weight of the base coating layer; and a clear coating layer provided on the base coating layer and comprising a silica and 2.0 to 5.0 wt % of beads based on a total weight of the clear coating layer.

The base coating layer may include 3.5 wt % of the first silica based on the total weight of the base coating layer.

The clear coating layer may include 2.0 wt % of beads based on the total weight of the clear coating layer.

The steel sheet may include an 85° gloss measurement value of 10 or less.

The 85° gloss measurement value may be less than a 60° gloss measurement value of the steel sheet.

According to an aspect of the disclosure, a method of manufacturing a steel sheet includes: forming, on a base steel sheet, a base coating layer comprising 2.5 to 4.0 wt % of a silica based on a total weight of the base coating layer; and forming, on the base coating layer, a clear coating layer comprising a silica and 2.0 to 5.0 wt % of beads based on a total weight of the clear coating layer.

BRIEF DESCRIPTION OF THE DRAWINGS

The above and other aspects, features, and advantages of specific embodiments of the present disclosure will be more apparent from the following description with reference to the accompanying drawings, in which.

DETAILED DESCRIPTION

Figure 1:
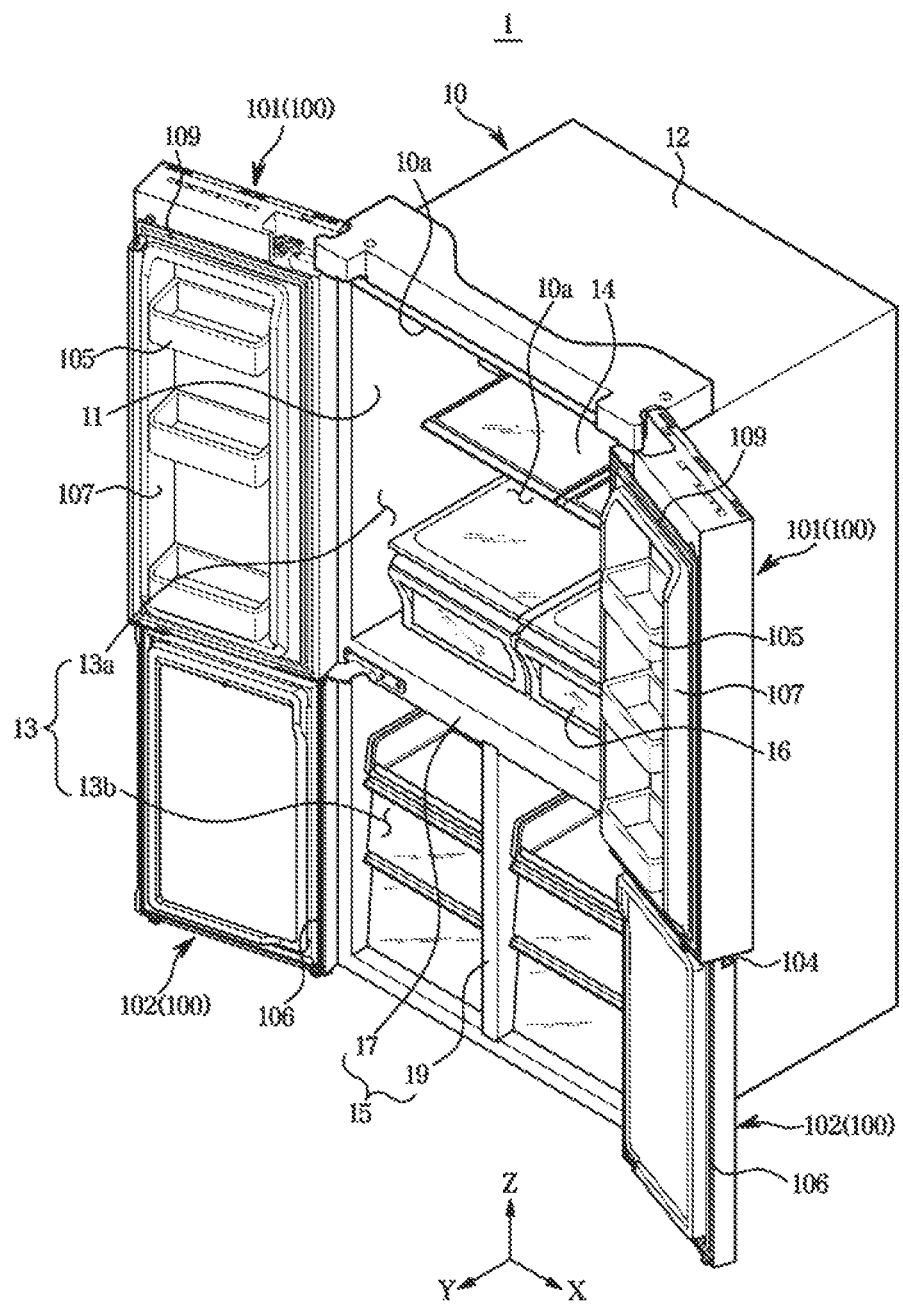
FIG. 1 is a perspective view of a refrigerator according to an embodiment.

Like reference numerals refer to like elements throughout the specification. Not all details of embodiments of the disclosure are described herein, and description of general art to which the disclosure pertains or overlapping descriptions between embodiments are omitted. Terms, such as "unit," "module," "member," and "block," used herein may be implemented by software or hardware. According to different embodiments, a plurality of units, modules, members, and blocks may be implemented by a single element, or each of a single unit, a single module, a single member, and a single block may include a plurality of elements.

Throughout the specification, a certain part being "connected" to another part includes the certain part being directly connected to the other part or being indirectly connected to the other part by another element. Indirect connection includes connection through a wireless communication network or electrical connection through an electric wire.

In addition, a certain part "including" a certain element signifies that the certain part may further include another element instead of excluding the other element unless particularly indicated otherwise.

Throughout the specification, when a certain member is referred to as being "on" another member, this encompasses not only the case in which the two members are in contact with each another but also the case in which the two members have a third member therebetween.

Throughout the specification, when a certain element transmits or sends a signal or data to another element, this does not exclude transmission or sending through a third element present between the two elements unless particularly indicated otherwise.

Throughout the specification, ordinal numbers such as "first" and "second" are used to distinguish a plurality of elements from each other, and the ordinal numbers used do not indicate an arrangement order, manufacturing order, or importance among elements.

A singular expression includes a plural expression unless clearly indicated otherwise in the context.

A reference numeral given to each step is used to identify each step. The reference numerals are not for limiting an order of the steps, and the steps may be performed in an order different from that shown in the drawings unless a specific order is clearly described in the context.

Hereinafter, a steel sheet, a refrigerator including the same, and a method of manufacturing the steel sheet will be described in detail with reference to the accompanying drawings.

FIG. 1 is a perspective view of a refrigerator 1 according to an embodiment.

Referring to FIG. 1, a refrigerator 1 includes a body 10, a storage compartment 13 formed to have upper and lower sections inside the body 10, a door 100 which allows the storage compartment 13 to be opened and closed, and a cold air supply device which supplies cold air to the storage compartment 13.

The body 10 may be configured to include an inner case 11 forming the storage compartment 13, an outer case 12 coupled to an outside of the inner case 11 to form an exterior, and a body insulating material that is filled between the inner case 11 and the outer case 12 to insulate the storage compartment 13. The outer case 12 may be manufactured using a pre-coated-metal (PCM) steel sheet 300, and a further description thereof is described below.

The cold air supply device may generate cold air using a circulating cooling cycle of compressing, condensing, expanding, and evaporating a refrigerant.

The storage compartment 13 may be divided into a plurality of sections by a partition 15, and a plurality of shelves 14 and storage containers 16 may be provided inside the storage compartment 13 so that storage of food and the like is possible.

The storage compartment 13 may be divided into a plurality of storage compartments, such as a first storage compartment 13a and a second storage compartment 13b, by the partition 15, and the partition 15 includes a first partition 17 horizontally disposed to divide the inside of the storage compartment 13 in the vertical direction and a second partition 19 vertically disposed to divide the inside of the storage compartment 13 in the horizontal direction.

The division of the storage compartment 13 as described above is provided as one example, and the storage compartment 13 may also be divided in other ways than the above-described example.

The storage compartment 13 may be opened and closed by the door 100. The door 100 may include a pair of first doors (or upper doors 101) which allow the upper storage compartment 13a to be opened and closed and a pair of second doors (or lower doors 102) which allow the lower storage compartment 13b to be opened and closed.

The pair of first doors 101 and the pair of second doors 102 may allow a body opening 10a of the opened body 10 to be opened and closed. The first door 101 and the second door 102 may be provided with a handle, and a user can open and close the first door 101 and the second door 102 using the handles provided on the first door 101 and the second door 102.

A door shelf 105 capable of storing food may be provided on the rear surface of the first door 101. The door shelf 105 may include a shelf support 107 formed to vertically extend from the first door 101 so that the shelf support supports the door shelf 105 at both sides of the door shelf 105. The shelf support 107 may be detachably provided on the first door 101 as a separate component, and in the embodiment, is provided so as to protrude backward from the rear surface of the first door 101 and extend in the vertical direction.

A first gasket 109 may be provided at the edge of the rear surface of the first door 101 so that a gap between the first door 101 and the body 10 is sealed when the first door 101 is closed. The first gasket 109 may be installed in the form of a loop along the edge of the rear surface of the first door 101 and may include a first magnet therein.

The lower storage compartment 13b may be opened and closed by the second door 102 rotatably coupled to the body 10. A second gasket 106 may be provided at the edge of the rear surface of the second door 102 so that a gap between the second door 102 and the body 10 is sealed when the second door 102 is closed. The second gasket 106 may be installed in the form of a loop along the edge of the rear surface of the second door 102 and may include a second magnet therein.

Meanwhile, the outer case forming an outer surface of a refrigerator body may be made of a PCM steel sheet as described above. The rear surface of a steel sheet used in the outer surface of a refrigerator body may be subjected to urethane foam filling treatment for insulation and soundproofing. The filling treatment is required for insulation, soundproofing, and sound absorption, but there is a problem in that an irregular curvature occurs on the outer surface of the steel sheet after the filling treatment.

The curvature formed on the outer surface of the steel sheet is perceived by a user and acts as an element that degrades the aesthetic quality of a product, and thus commerciality is lowered.

Accordingly, the disclosed embodiments are directed to providing a steel sheet in which the visibility of the curvature of the outer surface of a body which degrades the aesthetic quality of a product is decreased, a refrigerator including the same, and a method of manufacturing the steel sheet.

More specifically, continuous attempts have been made to lower the surface glossiness of a steel sheet for decreasing the visibility of such curvature. However, surface glossiness, which is improved by the attempts, was front glossiness, that is, 60° glossiness. In addition, in the case of a steel sheet, a matting agent may be added to only an upper coating layer to lower surface glossiness. As a result, as the surface glossiness of a steel sheet is lowered, the visibility of the curvature is decreased, but the decrease was insignificant, and there was no fundamental improvement thereby.

The present inventors found that the curvature is not perceived well from the front but perceived well from the side. As a result of measuring the glossiness of a curved steel sheet at each angle (20°, 60°, and 85°) using a gloss meter, the present inventors found that, as an 85° glossiness is lower, the visibility of the curvature is decreased. Particular, the inventors found that, when an 85° glossiness is 10 or less, the visibility of the curvature is decreased to a desired level. Also, the inventors found that, as an 85° glossiness is lower than a 60° glossiness, the visibility of the curvature is further decreased.

Accordingly, an embodiment may solve degradation of commerciality by providing a steel sheet whose visibility of the curvature is decreased by lowering an 85° glossiness, at which the curvature is perceived, to 10 or less.

Figure 2:
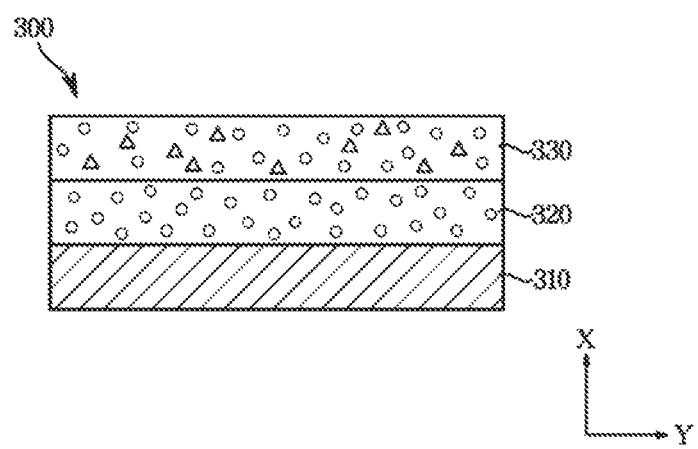
FIG. 2 is a sectional side view of a laminated structure of a steel sheet according to an embodiment.
Figure 3:
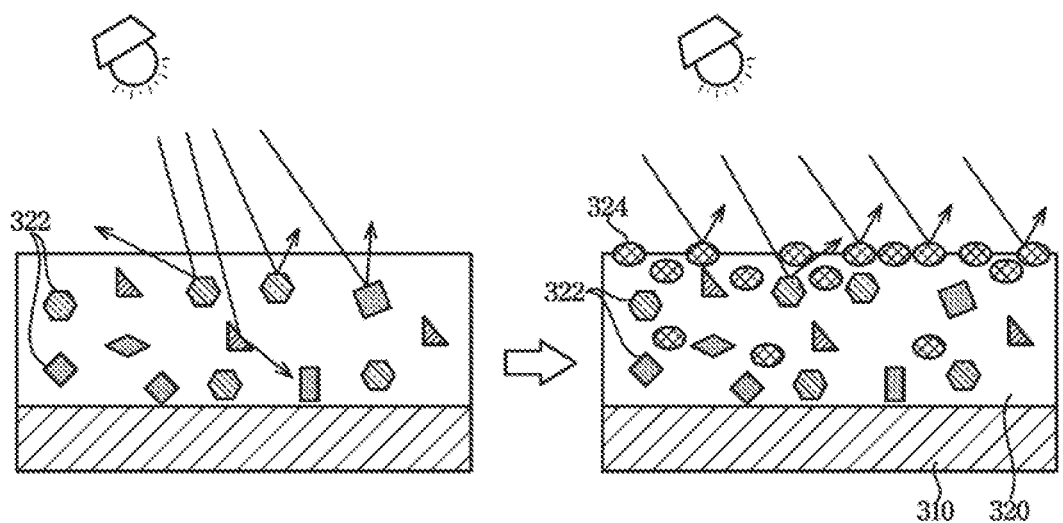
FIG. 3 is a schematic diagram of a mechanism in which the side glossiness of a steel sheet according to an embodiment is lowered.
Figure 4:
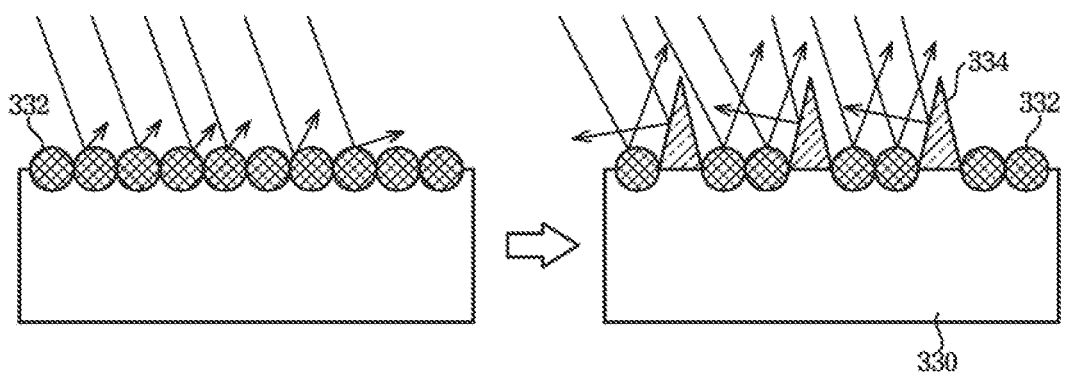
FIG. 4 is a schematic diagram of a mechanism in which the side glossiness of a steel sheet according to an embodiment is lowered.

Hereinafter, the steel sheet for a refrigerator body according to an embodiment will be described with reference to FIG. 2, FIG. 3, and FIG. 4. FIG. 2 shows a laminated structure of a steel sheet 300 according to an embodiment, and FIGS. 3 and 4 are schematic diagrams of a mechanism in which the side glossiness of a steel sheet 300 according to an embodiment is lowered.

Referring to FIG. 2, a steel sheet 300 according to the disclosed embodiment includes a base steel sheet 310, a base coating layer 320 formed on the base steel sheet 310, and a clear coating layer 330 formed on the base coating layer 320.

The steel sheet 300 for a refrigerator body according to the disclosed embodiment is a pre-coated-metal (PCM) steel sheet and is obtained by coating a base steel sheet 310 such as electrolytic galvanized iron (EGI), a hot-dip galvanized steel sheet (GI), or the like.

The hot-dip galvanized steel sheet is a steel sheet plated by melting a full hard sheet obtained by subjecting a hot-rolled steel sheet to pickling and rolling and passing the molten sheet through a zinc pot. The hot-dip galvanized steel sheet can secure excellent corrosion resistance because thicker plating is possible as compared to electrolytic galvanized iron.

Electrolytic galvanized iron is a product whose corrosion resistance is improved by subjecting a cold-rolled steel sheet to electrolytic galvanization. Although a plating amount is small compared to the hot-dip galvanized steel sheet, electrolytic galvanized iron has a uniform plating layer thickness and an aesthetically pleasing surface and is plated at low temperature, and thus mechanical properties of the cold-rolled steel sheet, which is a material, are maintained as they are.

The PCM steel sheet 300 may be manufactured by a 2 coating-2 baking (2C-2B) method including forming a base coating layer 320 and a clear coating layer 330 on a base steel sheet 310 and performing firing after the formation of each coating layer. Alternatively, the PCM steel sheet 300 may be manufactured by a 3 coating-3 baking (3C-3B) method including forming a primer coating layer, a base coating layer 320, and a clear coating layer 330 on a base steel sheet 310 and performing firing after the formation of each coating layer. Hereinafter, in the disclosed embodiment, a steel sheet manufactured by the 2C-2B method will be described as an example.

The base coating layer 320 is formed on the above-described base steel sheet 310. The base coating layer 320 includes a polyester resin as a main resin and may include a leveling agent, a pigment, and the like. The base coating layer 320 of the steel sheet 300 according to the disclosed embodiment includes silica 324 as a matting agent in addition to the above-described components.

The matting agent is an additive added to decrease the glossiness of the steel sheet 300, and the base coating layer 320 of the steel sheet 300 according to the disclosed embodiment may comprise 2.5 to 3.5 wt % of silica 324, and more preferably, 3.5 wt % of silica 324 based on the total weight of the base coating layer 320. As silica 324, acrylic-coated organic silica may be used, but the disclosure is not limited thereto.

Referring to FIG. 3, metallic particles 322 of the pigment included in the base coating layer 320 causes diffuse reflection of light incident from the outside, and accordingly, side glossiness, that is, 85° glossiness, is increased. As described above, when side glossiness is increased, the visibility of the curvature of the outer surface of the steel sheet 300 is also increased. Accordingly, in the disclosed embodiment, silica 324 is added as a matting agent to interfere with diffuse reflection caused by the metallic particles 322 of the pigment, and thus visibility according to 85° glossiness is decreased.

As a result of 85° glossiness measurement, the base coating layer 320 including 3.5 wt % of silica 324 exhibits a gloss measurement value of 5.2, and a base coating layer including no silica 324 or a small amount (0.8 wt %) of silica exhibits a high 85° gloss measurement value of 62.4.

In other words, since the base coating layer 320 including silica 324 in the content range according to the disclosed embodiment exhibits a lower 85° gloss measurement value than a base coating layer including silica outside the content range, side visibility with respect to the curvature can be decreased.

As described above, the side glossiness of the steel sheet 300 may be degraded by including silica 324 as a matting agent in not only the clear coating layer 330 to be described below but also the base coating layer 320.

The clear coating layer 330 is formed on the base coating layer 320. The clear coating layer 330 includes a polyester resin as a main resin and may include a leveling agent and the like. The clear coating layer 330 of the steel sheet 300 according to the disclosed embodiment includes silica 332 and beads 334 as a matting agent in addition to the above-described components.

The clear coating layer 330 of the steel sheet 300 according to the disclosed embodiment may include 2.0 to 5.0 wt % of beads 334, and more preferably, 2.0 wt % of beads 334 based on the total weight of the clear coating layer 330. As the beads 334, acrylic beads may be used, but the disclosure is not limited thereto. Also, the beads 334 may have a size of 20 to 50 μm, and preferably, 20 μm in diameter.

Along with the above-described beads 334, silica 332 may also be included as a matting agent. Silica 332 may be included in an amount of 5 wt % based on the total weight of the clear coating layer 330.

Referring to FIG. 4, when both silica 332 and acrylic beads 334 having a rough particle shape are used as matting agents in the clear coating layer 330, diffuse reflection of light is maximized, and thus side glossiness, that is, 85° glossiness, is decreased. Therefore, visibility according to 85° glossiness can be decreased.

The degree of decrease in side glossiness of the steel sheet 300 according to an embodiment will be described below in detail with reference to Table 1.

Figure 5:
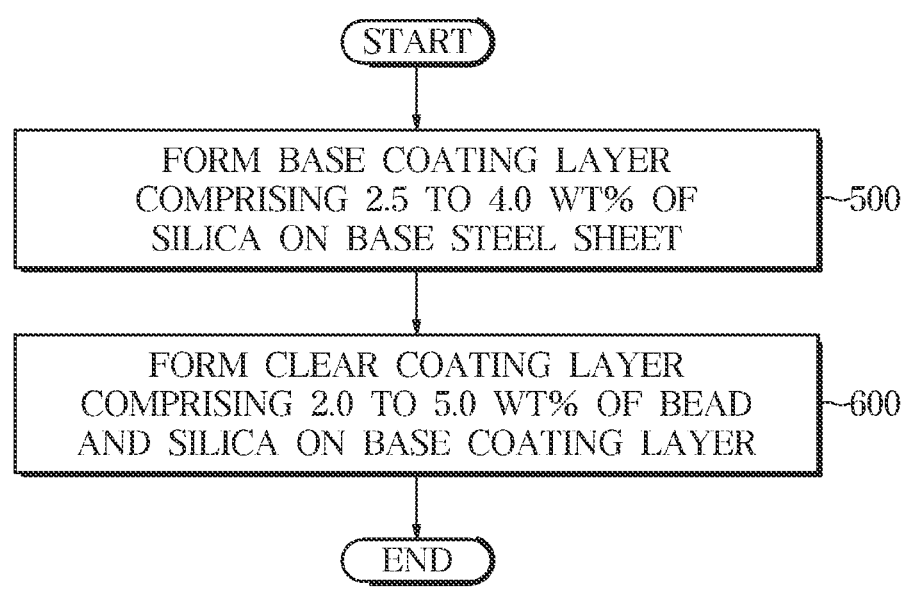
FIG. 5 is a flow chart of a method of manufacturing a steel sheet according to an embodiment.

FIG. 5 is a flow chart of a method of manufacturing a steel sheet according to an embodiment.

Referring to FIG. 5, a method of manufacturing the steel sheet 300 according to an embodiment includes: forming a base coating layer 320 on a base steel sheet 310 (at operation 500); and forming a clear coating layer 330 on the base coating layer 320 (at operation 600).

The steel sheet 300 for a refrigerator body according to the disclosed embodiment is a pre-coated-metal (PCM) steel sheet and is obtained by coating a base steel sheet 310 such as electrolytic galvanized iron (EGI), a hot-dip galvanized steel sheet (GI), or the like.

The base coating layer 320 is formed on the above-described base steel sheet 310. The base coating layer 320 includes a polyester resin as a main resin and may include a leveling agent, a pigment, and the like. The base coating layer 320 of the steel sheet 300 according to the disclosed embodiment includes silica 324 as a matting agent in addition to the above-described components.

The matting agent is an additive added to decrease the glossiness of the steel sheet 300, and the base coating layer 320 of the steel sheet 300 according to the disclosed embodiment may include 2.5 to 3.5 wt % of silica 324, and more preferably, 3.5 wt % of silica 324 based on the total weight of the base coating layer 320. As silica 324, acrylic-coated organic silica may be used, but the disclosure is not limited thereto.

The clear coating layer 330 is formed on the base coating layer 320. The clear coating layer 330 includes a polyester resin as a main resin and may include a leveling agent and the like. The clear coating layer 330 of the steel sheet 300 according to the disclosed embodiment includes silica 332 and beads 334 as matting agents in addition to the above-described component.

The clear coating layer 330 of the steel sheet 300 according to the disclosed embodiment may include 2.0 to 5.0 wt % of beads 334, and more preferably, 2.0 wt % of beads 334 based on the total weight of the clear coating layer 330. As the beads 334, acrylic beads may be used, but the disclosure is not limited thereto. Also, the beads 334 may have a size of 20 to 50 μm, and preferably, 20 μm in diameter.

Along with the above-described beads 334, silica 332 may also be included as a matting agent. Silica 332 may be included in an amount of 5 wt % based on the total weight of the clear coating layer 330.

Referring to FIG. 4, when both silica 332 and acrylic beads 334 having a rough particle shape are used as matting agents in the clear coating layer 330, diffuse reflection of light is maximized, and thus side glossiness, that is, 85° glossiness, is decreased. Therefore, visibility according to 85° glossiness can be decreased.

Hereinafter, referring to Table 1, the gloss measurement value of the steel sheet 300 including the base coating layer 320 and the clear coating layer 330 according to an embodiment will be compared with those of comparative examples.

and smaller than a 60° gloss measurement value of 5.9. In the case of Comparative Example 1, the content of silica included in a base coating layer was below the lower limit of the content range according to the disclosed embodiment, and beads were not included in a clear coating layer. The steel sheet according to Comparative Example 1 exhibited an 85° gloss measurement value of 28.0, which exceeds 10 and is larger than a 60° gloss measurement value of 7.0. In other words, when the content of silica included in a base coating layer is below the lower limit of the content range according to the disclosed embodiment and beads are not included in a clear coating layer, the visibility of the curvature of the outer surface of the steel sheet is not decreased.

In the case of Comparative Example 2, the content of silica included in a base coating layer fell within the content range according to the disclosed embodiment, but beads were not included in a clear coating layer. The steel sheet according to Comparative Example 2 exhibited an 85° gloss measurement value of 11.9, which exceeds 10 and is larger than a 60° gloss measurement value of 5.2. In other words, when beads are not included in a clear coating layer even though the content of silica included in a base coating layer falls within the content range according to the disclosed embodiment, the visibility of the curvature of the outer surface of the steel sheet is not decreased to a desired level.

In the case of Comparative Example 3, beads were included in an amount of 2.0 wt %, which falls within the bead content range according to the disclosed embodiment, in a clear coating layer, but the content of silica included in a base coating layer was below the lower limit of the content range according to the disclosed embodiment. The steel sheet according to Comparative Example 3 exhibited an 85° gloss measurement value of 10.6, which exceeds 10 and is larger than a 60° gloss measurement value of 5.3. In other words, when the content of silica included in a base coating layer is below the lower limit of the content range according to the disclosed embodiment even though the content of beads included in a clear coating layer falls within the content range according to the disclosed embodiment, the visibility of the curvature of the outer surface of the steel sheet is not decreased to a desired level.

As described above, when the base coating layer 320 of the steel sheet 300 includes 2.5 to 4.0 wt %, and preferably, 3.5 wt % of silica 324 and the clear coating layer 330 includes 2.0 to 5.0 wt %, and preferably, 2.0 wt % of beads 334, and silica 332, an 85° gloss measurement value of 10

TABLE 1

| Classification | | Comparative Example 1 | | Comparative Example 2 | | Comparative Example 3 | | Example | |
|---|---|---|---|---|---|---|---|---|---|
| Coating layer | | Base | Clear | Base | Clear | Base | Clear | Base | Clear |
| Content (wt %) 함량 (중량%) | Silica | 0.8% | 5.0% | 3.5% | 5.0% | 0.8% | 5.0% | 3.5% | 5.0% |
| | Beads | — | — | — | — | — | 2.0% | — | 2.0% |
| Gloss measurement value 광택측정값 광택측정값 | 20° | 1.5 | | 0.8 | | 1.2 | | 1.0 | |
| | 60° | 7.0 | | 5.2 | | 5.3 | | 5.9 | |
| | 85° | 28.0 | | 11.9 | | 10.6 | | 4.2 | |

Referring to Table 1, in the case of the steel sheet 300 according to the example, the base coating layer 320 included 3.5 wt % of silica 324, and the clear coating layer 330 included 5.0 wt % of silica 332 and 2.0 wt % of beads 334. The steel sheet 300 according to the example exhibited an 85° gloss measurement value of 4.2, which is 10 or less or less is exhibited, and thus the visibility of the curvature of the outer surface of the steel sheet 300 is decreased. Also since the 85° gloss measurement value becomes smaller than a 60° gloss measurement value, the visibility of the curvature of the outer surface of the steel sheet 300 is further decreased.

While certain example embodiments have been described above, the disclosure is not limited thereto, and it may be understood by those skilled in the art that various modifications and alterations may be made without departing from the concept and scope of the following claims.

What is claimed is:

1. A refrigerator comprising:
a body; and
a door rotatably coupled to the body,
wherein the body comprises:
a base steel sheet;
a base coating layer provided on the base steel sheet and comprising 2.5 to 4.0 wt % of a silica based on a total weight of the base coating layer; and
a clear coating layer provided on the base coating layer and comprising a silica and 2.0 to 5.0 wt % of beads based on a total weight of the clear coating layer.

2. The refrigerator of claim 1, wherein the base coating layer comprises 3.5 wt % of the silica based on the total weight of the base coating layer.

3. The refrigerator of claim 1, wherein the silica of the base coating layer comprises acrylic-coated organic silica.

4. The refrigerator of claim 1, wherein the clear coating layer comprises 2.0 wt % of the beads based on the total weight of the clear coating layer.

5. The refrigerator of claim 1, wherein the beads of the clear coating layer have a size of 20 to 50 μm in diameter.

6. The refrigerator of claim 1, wherein the beads of the clear coating layer have a size of 20 μm in diameter.

7. The refrigerator of claim 1, wherein the clear coating layer comprises 5.0 wt % of the silica based on the total weight of the clear coating layer.

8. The refrigerator of claim 1, wherein an 85° gloss measurement value of the body is 10 or less gloss units (GU).

9. The refrigerator of claim 8, wherein the 85° gloss measurement value is less than a 60° gloss measurement value of the body.

10. The refrigerator of claim 1,
wherein the clear coating layer comprises 2.0 wt % of the beads based on the total weight of the clear coating layer, and
wherein the clear coating layer further comprises 5.0 wt % of the silica based on the total weight of the clear coating layer.

11. A steel sheet comprising:
a base steel sheet;
a base coating layer provided on the base steel sheet and comprising 2.5 to 4.0 wt % of a silica based on a total weight of the base coating layer; and
a clear coating layer provided on the base coating layer and comprising a silica and 2.0 to 5.0 wt % of beads based on a total weight of the clear coating layer.

12. The steel sheet of claim 11, wherein the base coating layer comprises 3.5 wt % of the silica based on the total weight of the base coating layer.

13. The steel sheet of claim 11, wherein the clear coating layer comprises 2.0 wt % of the beads based on the total weight of the clear coating layer.

14. The steel sheet of claim 11, wherein an 85° gloss measurement value of the steel sheet is 10 or less gloss units (GU).

15. The steel sheet of claim 14, wherein the 85° gloss measurement value is less than a 60° gloss measurement value of the steel sheet.

16. A method of manufacturing a steel sheet, comprising:
forming, on a base steel sheet, a base coating layer comprising 2.5 to 4.0 wt % of a silica based on a total weight of the base coating layer; and
forming, on the base coating layer, a clear coating layer comprising a silica and 2.0 to 5.0 wt % of beads based on a total weight of the clear coating layer.

\* \* \* \* \*